(12) United States Patent
Kidder et al.

(10) Patent No.: US 8,677,342 B1
(45) Date of Patent: Mar. 18, 2014

(54) SYSTEM, METHOD AND APPARATUS FOR REPLACING WIRELESS DEVICES IN A SYSTEM

(75) Inventors: Kenneth Kidder, Coon Rapids, MN (US); Steven Nichols, Maple Grove, MN (US); Cary Leen, Hammond, WI (US)

(73) Assignee: Honeywell International Inc., Morristown, NJ (US)

( * ) Notice: Subject to any disclaimer, the term of this patent is extended or adjusted under 35 U.S.C. 154(b) by 1552 days.

(21) Appl. No.: 12/253,698

(22) Filed: Oct. 17, 2008

(51) Int. Cl.
- *G06F 9/44* (2006.01)
- *G06F 9/00* (2006.01)
- *G06F 15/173* (2006.01)
- *G06F 15/177* (2006.01)

(52) U.S. Cl.
USPC ........... 717/171; 713/100; 709/221; 709/224; 709/226

(58) Field of Classification Search
None
See application file for complete search history.

(56) References Cited

U.S. PATENT DOCUMENTS

| | | | | |
|---|---|---|---|---|
| 5,307,465 A | * | 4/1994 | Iki | 709/221 |
| 5,437,015 A | * | 7/1995 | Iki | 709/221 |
| 5,463,659 A | | 10/1995 | Nealon et al. | |
| 5,521,972 A | * | 5/1996 | Iki | 379/230 |
| 5,619,716 A | * | 4/1997 | Nonaka et al. | 717/167 |
| 5,745,669 A | * | 4/1998 | Hugard et al. | 714/3 |
| 5,758,290 A | | 5/1998 | Nealon et al. | |
| 5,867,714 A | * | 2/1999 | Todd et al. | 717/172 |
| 5,927,599 A | | 7/1999 | Kath | |
| 6,028,885 A | | 2/2000 | Minarik et al. | |
| 6,044,399 A | * | 3/2000 | Elledge | 709/220 |
| 6,096,094 A | * | 8/2000 | Kay et al. | 717/168 |
| 6,119,157 A | * | 9/2000 | Traversat et al. | 709/220 |
| 6,213,404 B1 | | 4/2001 | Dushane et al. | |
| 6,598,134 B2 | * | 7/2003 | Ofek et al. | 711/162 |
| 6,700,920 B1 | | 3/2004 | Partyka | |
| 6,742,025 B2 | * | 5/2004 | Jennery et al. | 709/220 |
| 6,760,761 B1 | * | 7/2004 | Sciacca | 709/220 |
| 6,778,902 B2 | | 8/2004 | Hathiram et al. | |
| 6,859,450 B1 | | 2/2005 | Mansfield | |
| 6,859,923 B2 | * | 2/2005 | Taylor | 717/172 |
| 6,870,875 B1 | | 3/2005 | Partyka | |
| 6,925,105 B1 | | 8/2005 | Partyka | |
| 6,952,703 B1 | * | 10/2005 | Kathail et al. | 1/1 |
| 6,965,928 B1 | * | 11/2005 | Cox et al. | 709/220 |
| 7,050,906 B2 | | 5/2006 | Hathiram et al. | |
| 7,173,651 B1 | * | 2/2007 | Knowles | 348/207.1 |
| 7,203,864 B2 | * | 4/2007 | Goin et al. | 714/26 |
| 7,219,344 B2 | * | 5/2007 | Chenelle et al. | 717/177 |

(Continued)

OTHER PUBLICATIONS

U.S. Appl. No. 12/253,613, filed Oct. 17, 2008, Nichols et al.

(Continued)

*Primary Examiner* — Tuan Q. Dam
*Assistant Examiner* — Zheng Wei
(74) *Attorney, Agent, or Firm* — Seager Tufte & Wickhem LLC

(57) ABSTRACT

Systems, methods and apparatuses for replacing communication devices in a system. Configuration data of a replacement device (which may include a sub-part of the device) that is requesting inclusion in the system is received by a receiving device, which determines whether the received configuration data matches existing configuration data stored for an existing device currently included in the system. Upon identifying a match of the relevant configuration data, the device data associated with the existing device is identified, and replaced with device data of the replacement device, thereby effecting a one-step replacement of the existing device by providing the configuration data of the replacement device.

20 Claims, 9 Drawing Sheets

(56) References Cited

U.S. PATENT DOCUMENTS

| | | | |
|---|---|---|---|
| 7,224,713 B2 | 5/2007 | Partyka | |
| 7,266,818 B2* | 9/2007 | Pike et al. | 717/176 |
| 7,301,986 B2 | 11/2007 | Partyka | |
| 7,302,558 B2* | 11/2007 | Campbell et al. | 713/1 |
| 7,370,323 B2* | 5/2008 | Marinelli et al. | 717/173 |
| 7,380,177 B2* | 5/2008 | Goin et al. | 714/47.3 |
| 7,383,271 B2* | 6/2008 | Yip et al. | 1/1 |
| 7,386,845 B1* | 6/2008 | Fox et al. | 717/170 |
| 7,438,217 B2* | 10/2008 | Bhella et al. | 235/375 |
| 7,552,202 B2* | 6/2009 | Brown et al. | 709/220 |
| 7,565,443 B2* | 7/2009 | Rossmanith et al. | 709/238 |
| 7,577,948 B2* | 8/2009 | Zomaya et al. | 717/168 |
| 7,711,983 B2* | 5/2010 | Hatasaki et al. | 714/13 |
| 7,769,990 B1* | 8/2010 | Okcu et al. | 713/1 |
| 7,774,774 B1* | 8/2010 | Mulligan et al. | 717/174 |
| 7,779,297 B2* | 8/2010 | Nishii et al. | 714/10 |
| 7,802,082 B2* | 9/2010 | Kruse et al. | 713/1 |
| 7,827,199 B2* | 11/2010 | Yip et al. | 707/791 |
| 7,844,766 B1* | 11/2010 | Straitiff | 710/72 |
| 7,864,704 B2* | 1/2011 | Lee et al. | 370/254 |
| 7,941,479 B2* | 5/2011 | Howard et al. | 709/201 |
| 7,970,765 B1* | 6/2011 | Olsen et al. | 707/737 |
| 7,984,199 B2* | 7/2011 | Ferguson et al. | 710/8 |
| 8,041,986 B2* | 10/2011 | Hatasaki et al. | 714/4.12 |
| 8,055,772 B2* | 11/2011 | Cyr et al. | 709/226 |
| 8,086,906 B2* | 12/2011 | Ritz et al. | 714/48 |
| 8,089,953 B2* | 1/2012 | Angelot et al. | 370/351 |
| 8,099,728 B2* | 1/2012 | Marinelli et al. | 717/173 |
| 8,132,186 B1* | 3/2012 | Okcu et al. | 719/321 |
| 8,527,888 B2* | 9/2013 | Bump et al. | 715/748 |
| 2002/0046272 A1* | 4/2002 | Ikeda | 709/223 |
| 2002/0165977 A1* | 11/2002 | Novaes | 709/238 |
| 2003/0105847 A1* | 6/2003 | Jennery et al. | 709/223 |
| 2003/0195938 A1* | 10/2003 | Howard et al. | 709/208 |
| 2003/0212684 A1* | 11/2003 | Meyer et al. | 707/10 |
| 2004/0003266 A1* | 1/2004 | Moshir et al. | 713/191 |
| 2004/0015938 A1* | 1/2004 | Taylor | 717/168 |
| 2004/0052343 A1* | 3/2004 | Glaser et al. | 379/88.22 |
| 2004/0128664 A1* | 7/2004 | Johnson | 717/168 |
| 2004/0162975 A1* | 8/2004 | Yakovlev | 713/1 |
| 2004/0199615 A1* | 10/2004 | Philyaw | 709/220 |
| 2005/0047383 A1 | 3/2005 | Yoshida | |
| 2005/0114378 A1* | 5/2005 | Elien et al. | 707/102 |
| 2005/0204353 A1* | 9/2005 | Ji | 717/168 |
| 2005/0204359 A1* | 9/2005 | Beunings et al. | 719/313 |
| 2005/0216903 A1* | 9/2005 | Schaefer | 717/168 |
| 2005/0222969 A1* | 10/2005 | Yip et al. | 707/1 |
| 2005/0289071 A1* | 12/2005 | Goin et al. | 705/56 |
| 2005/0289401 A1* | 12/2005 | Goin et al. | 714/47 |
| 2006/0010438 A1* | 1/2006 | Brady et al. | 717/174 |
| 2006/0037012 A1* | 2/2006 | Zomaya et al. | 717/168 |
| 2006/0104220 A1* | 5/2006 | Yamazaki et al. | 370/254 |
| 2006/0130050 A1* | 6/2006 | Betts et al. | 717/171 |
| 2006/0168436 A1* | 7/2006 | Campbell et al. | 713/1 |
| 2006/0179432 A1* | 8/2006 | Walinga et al. | 717/171 |
| 2006/0206594 A1* | 9/2006 | Brown et al. | 709/220 |
| 2006/0227852 A1 | 10/2006 | Black | |
| 2007/0214206 A1* | 9/2007 | Malloy et al. | 709/200 |
| 2007/0220323 A1* | 9/2007 | Nagata | 714/13 |
| 2007/0228137 A1* | 10/2007 | Bhella et al. | 235/375 |
| 2007/0250180 A1* | 10/2007 | Bump et al. | 700/1 |
| 2007/0291822 A1 | 12/2007 | Staley et al. | |
| 2008/0091746 A1* | 4/2008 | Hatasaki et al. | 707/204 |
| 2008/0196107 A1* | 8/2008 | Yip et al. | 726/27 |
| 2008/0294933 A1* | 11/2008 | Nishii et al. | 714/5 |
| 2009/0089413 A1* | 4/2009 | Kamei et al. | 709/223 |
| 2009/0187668 A1* | 7/2009 | Arendt et al. | 709/230 |
| 2009/0187675 A1* | 7/2009 | Kinoshita et al. | 710/8 |
| 2009/0199204 A1* | 8/2009 | Frank | 719/313 |
| 2009/0201830 A1* | 8/2009 | Angelot et al. | 370/254 |
| 2009/0259737 A1* | 10/2009 | Aikoh et al. | 709/221 |
| 2009/0273433 A1* | 11/2009 | Rigatti et al. | 340/3.5 |
| 2010/0023713 A1* | 1/2010 | Nasu et al. | 711/161 |
| 2010/0071053 A1* | 3/2010 | Ansari et al. | 726/12 |
| 2010/0094924 A1* | 4/2010 | Howard et al. | 709/201 |
| 2010/0180148 A1* | 7/2010 | Hatasaki et al. | 714/4 |
| 2010/0235433 A1* | 9/2010 | Ansari et al. | 709/203 |
| 2010/0306760 A1* | 12/2010 | Mulligan et al. | 717/174 |
| 2012/0011392 A1* | 1/2012 | Hatasaki et al. | 714/4.11 |

OTHER PUBLICATIONS

U.S. Appl. No. 12/253,709, filed Oct. 17, 2008, Nichols.
U.S. Appl. No. 12/253,696, filed Oct. 17, 2008, Nichols.
U.S. Appl. No. 12/253,772, filed Oct. 17, 2008, Kidder et al.

* cited by examiner

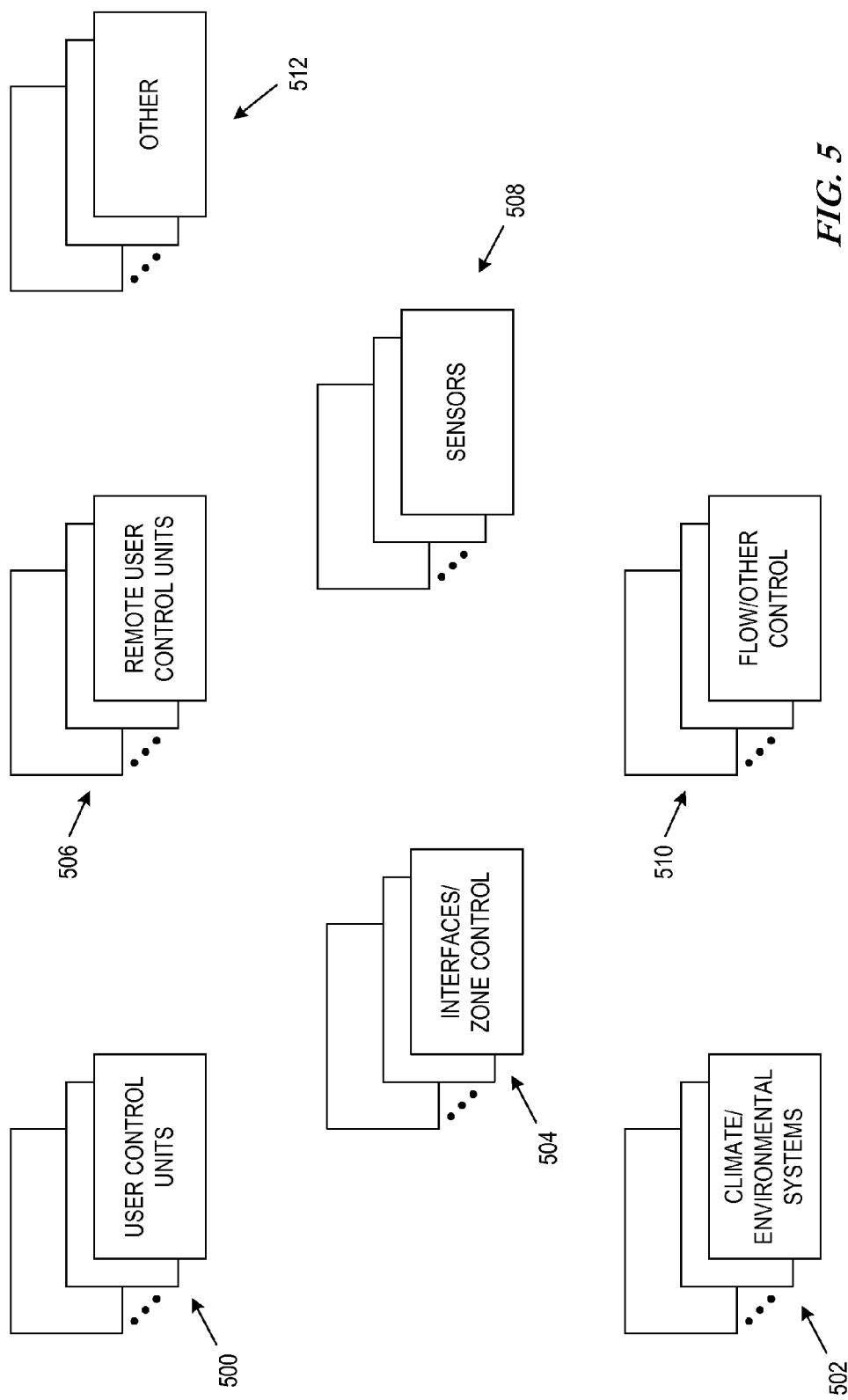

SYSTEM, METHOD AND APPARATUS FOR REPLACING WIRELESS DEVICES IN A SYSTEM

FIELD OF THE INVENTION

This invention relates in general to system device replacement, and more particularly to systems, apparatuses and methods for facilitating the replacement of wireless devices and/or functional units associated with devices in a system.

BACKGROUND OF THE INVENTION

Systems employing numerous devices often require or otherwise benefit from the ability for these devices to communicate with one another. While each device may have its own purpose and responsibilities, they may need to transmit information to, and/or receive information from, other devices of the system. Device-to-device communication may be accomplished by wiring the devices together, and communicating via the wires. In more recent times more and more systems are employing wireless communication, which generally makes installation more convenient, and among other things provides greater flexibility and scalability.

Devices in a system, and especially systems involving one or more wireless devices, may join or leave the system or network. Devices can join a system when the system is initially installed, or afterwards. When devices join a system of networked devices, other devices may need to know about the joining device so that the devices know they can accept messages from the joining device, the devices know where and how to send messages to the joining device, etc. Therefore, at least some, and in some cases all the devices may maintain some record of the other devices accepted into the system.

At some time, a device in the system may need to be replaced. For example, if a device fails, it may need to be replaced. Devices may also be replaced in view of maintenance schedules, product upgrades, etc. In such a case, the device to be replaced is typically removed from the system. One or more other devices that were configured to communicate with the removed device must be notified of the device's removal, so that those other devices can expunge the removed device from its stored record of known or otherwise accepted devices. Further, the replacement device is physically added to the system, which ordinarily undergoes an enrollment process with other devices so that those other devices can recognize it. The removal process of the old device, and the inclusion process of the replacement device, are handled by the installer of the replacement device.

Installers currently must know how to remove a device from the system and conduct a procedure to logically remove that device from the system so that it is no longer viewed by other devices as an actively operative device. The installer must then also know how to add the replacement device, and conduct another procedure to logically add that device to the system so that the system now recognizes the replacement device. This requires installer training, consumes time, is complex, and increases the chances of faulty installation of the replacement device.

Accordingly, there is a need in the communications industry for a manner of effectively and efficiently replacing devices in a system of communicating devices. The present invention fulfills these and other needs, and offers other advantages over the prior art.

SUMMARY OF THE INVENTION

To overcome limitations in the prior art, and to overcome other limitations that will become apparent upon reading and understanding the present specification, the present invention discloses systems, apparatuses and methods for facilitating the replacement of wireless devices and/or associated functional units in a system.

In accordance with one embodiment of the invention, a method is provided for replacing communication devices in a system. "Devices" in this context include entire devices or one or more functional units associated therewith. The method involves receiving device enrollment information including at least configuration data of a replacement device requesting inclusion in the system. The replacement device may be a device to completely replace another device, or the replacement device may represent a portion of a larger device such as a functional unit thereof. The method involves determining that the received configuration data matches existing configuration data stored for an existing device currently included in the system. Existing device data associated with the configuration data for the existing device currently included in the system is identified. The device data for the existing device is replaced with second device data corresponding to the replacement device.

According to another embodiment of such a method, replacing the existing device data involves removing a storage record that includes the existing device data and configuration data for the existing device, in response to determining that the received configuration data matches the existing configuration data stored for an existing device currently included in the system. A new storage record is added to replace the removed storage record, where the new storage record includes the received configuration data and the replacement device data. A more particular embodiment further involves transmitting an unenroll message to the existing device with an indication for the existing device to disassociate itself with the system.

According to another embodiment of the method, replacing the existing device data involves modifying existing device-specific data for the existing device with replacement device-specific data for the replacement device, and retaining the existing configuration data as the configuration data for the replacement device. In a more particular embodiment, modifying the existing device-specific data involves updating one or more device-specific data fields of a storage record that includes at least the one or more device-specific data fields and the existing configuration data for the existing device. In another particular embodiment, at least one of the device-specific data fields of the storage record includes a unique address identifier for the device associated with the storage record.

According to another embodiment of the method, receiving device enrollment information involves receiving identifying data that will identify the replacement device's role in the system. In a more particular embodiment, the identifying data includes a device type identifier and an identification of where in the system the replacement device will operate.

According to still another embodiment of such a method, identifying existing device data associated with the configuration data involves locating a storage record including the existing device data and the configuration data for the existing device currently in the system.

In yet another embodiment of the method determining that the received configuration data matches existing configuration data involves comparing the received configuration data to a data structure storing configuration data for each of the devices in the system.

In accordance with another embodiment of the invention, a method for replacing wireless communication devices in a heating, ventilation and air conditioning (HVAC) system is provided. The method includes a replacement client transmitting at least replacement configuration data requesting inclusion in the HVAC system. A host device receives the replacement configuration data, and compares it to a data structure of configuration data for each of a plurality of existing clients in the system that communicate with that host. In response to determining that the received replacement configuration data matches any configuration data in the data structure, a remove procedure is automatically invoked to expunge a data record in the data structure for the existing client to which the matching configuration data corresponds, and a replacement data record is added to the data structure for the replacement client.

In accordance with another embodiment of the invention, an apparatus is provided that includes a receiver, storage, a processor, and a compare module (which may be a programmed part of the processor). The receiver receives a wireless device enrollment request including at least configuration data of a replacement device requesting inclusion in the system. Some storage stores records for multiple devices in the system that communicate with the apparatus, where each of the records includes configuration data for its respective device. The compare module is coupled to receive the configuration data of the replacement device and the configuration data in the stored records, and is configured to determine whether the received configuration data matches the configuration data in any of the stored records. In response to the compare module's determination of a match of the received configuration data and the configuration data in one of the stored records, the processor invokes both a remove procedure to remove the matching one of the stored records, and an add procedure to add a new record for the replacement device to include the replacement device in the system.

According to another embodiment, the plurality of records each includes respective configuration data structured in one of a list, table, or database of devices that have undergone communication binding with the apparatus to enable communication with the apparatus.

Another embodiment of such an apparatus further includes a transmitter, where the processor directs the transmitter to transmit an unenroll message to the device associated with the removed record, and where the unenroll message includes an indication for the removed device to disassociate itself with the system.

In one embodiment, the replacement device comprises an environmental device operable in a heating, ventilation and air conditioning (HVAC) system.

In accordance with another embodiment of the invention, a system is provided that includes a plurality of HVAC client devices and at least one HVAC host device. The host device includes a receiver configured to receive a wireless client enrollment request including at least configuration data of a replacement HVAC client requesting inclusion in the system. The HVAC host includes storage that stores records for the plurality of HVAC clients, each of the records including configuration data for its respective HVAC client. The HVAC host further includes a comparator to identify a match of the received configuration data and the configuration data in one of the stored records. A host processor is configured to automatically invoke both a remove procedure to remove the matching one of the stored records, and an add procedure to add a new record for the replacement HVAC client to replace the removed record with the added new record, in response to identification of the match.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

FIG. 5 is a block diagram generally illustrating representative HVAC elements and devices in which air interfaces may be used;

DETAILED DESCRIPTION

Figure 1:
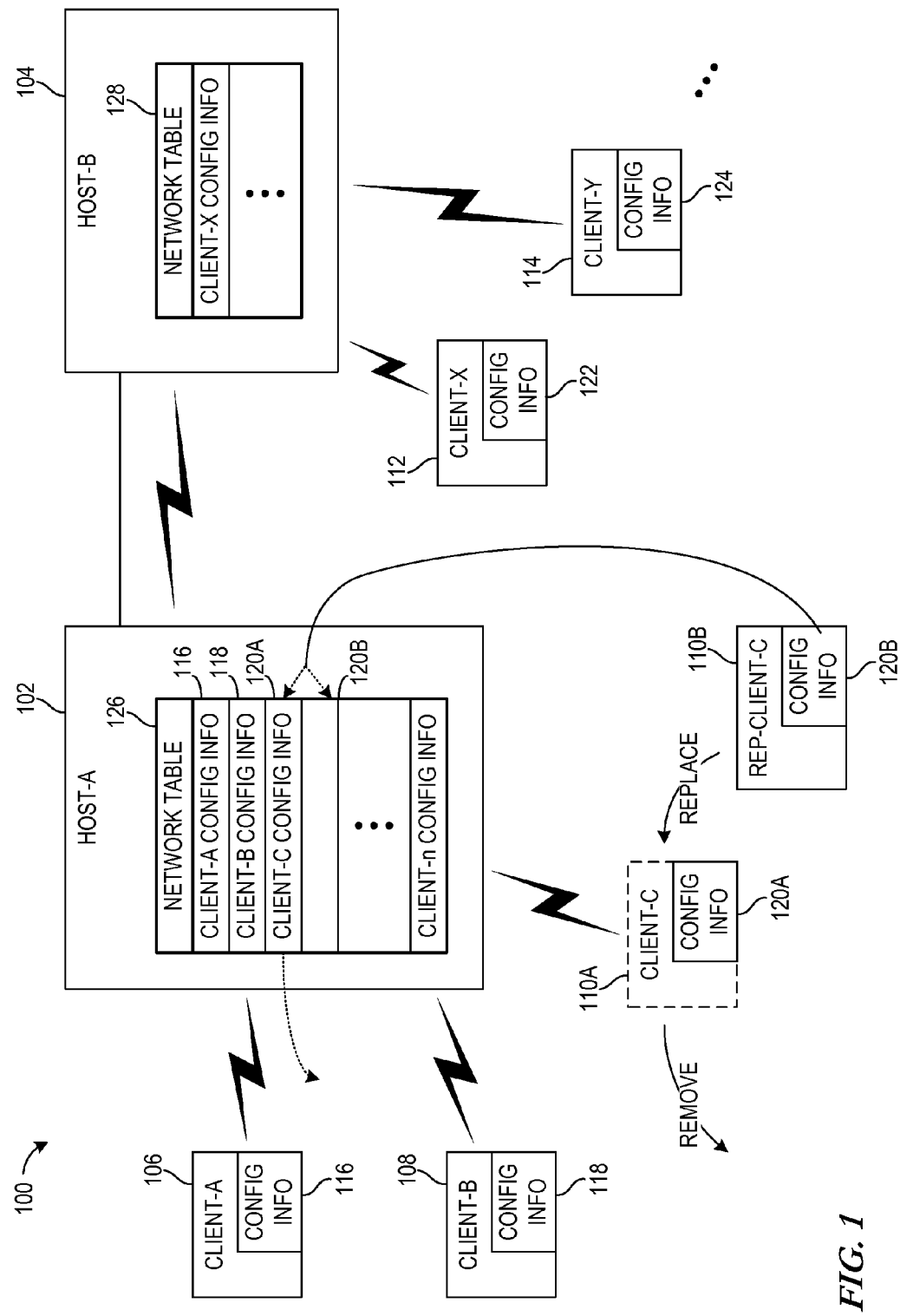
FIG. 1 is a block diagram generally illustrating a representative device replacement scenario in accordance with the present invention.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides systems, apparatuses and methods for streamlining the replacement of wireless devices in a system. As used herein, "devices" that can be replaced are not limited to entire physical devices, although the invention facilitates replacement of entire devices. However, "devices" as used herein also refers to sub-parts of any physical device, such as functional units associated with the device. For example, device replacement as used herein includes replacing a functional unit(s), such as a user interface, control processor, sensor and/or other functional element of the device. Thus, references to "device" are not to be limited to any single structure, as the device to be replaced may involve any one or more functional units associated with that device. Additionally, "replacement" of a device may or may not involve a physical exchange of entire devices. For example, replacement of a control algorithm of a device may involve replacing only the functional control unit of the device, where the remaining physical device otherwise remains in use and unchanged. While many embodiments of the present description are described in terms of replacing entire devices (e.g., a thermostat), this is for ease of description and facilitating an understanding of the invention. However, it should be recognized that references to replacing a device(s) is equally applicable to, and is intended to include, replacement of devices that form functional units of such devices.

While the invention can be implemented in wireless or wired environments, the description herein is directed to wireless embodiments. Devices in a system, and especially systems involving one or more wireless devices, may join or leave the system or network of devices at various times. One such time is during initial installation, where some or all of the devices may undergo an enrollment or binding process. Such an enrollment process allows devices to learn about each other so they can cooperate, such as communicate with one another, obtain authorization to communicate with one another, etc. Other devices may join the system after initial installation, such as when a new device is included in the system, at which time this new device(s) can be enrolled in the system.

The enrollment process involves binding the communicating devices so that they can communicate with one another. For example, in the context of wireless devices, devices may need to gain knowledge of the address(es) of other wireless devices that they can communicate with. This address or other information allows sending devices to address intended recipient devices correctly, and allows receiving devices to reject information from neighboring devices that are within the wireless communication range but not part of the particular system. Devices can be made aware of each other, and consequently each other's address, through a process of "binding" where information particular to each device is exchanged. A bound set of communication devices know the particular information of the other devices, and know which devices from which it should accept messages.

Another time in which a device may need to join the system is when an existing device, including a functional unit(s), of the system is to be replaced. In such a case, the device to be replaced is typically removed from the system. One or more other devices that were configured to communicate with the removed device must be notified of the device's removal, so that those other devices can expunge the removed device from its stored device configuration data, such as what may accompany the table/list of known or otherwise accepted devices. Further, the replacement device is physically added to the system, and then it undergoes an enrollment process with other devices so that those other devices can recognize it. The removal process of the old device, and the inclusion (e.g. enrollment) process of the replacement device, are handled by the installer of the replacement device.

Installers or repair personnel (hereinafter "installer") currently must know how to remove a device from the system and conduct a procedure to logically remove that device from the system so that it is no longer viewed by other devices as an actively operative device. The installer must then also know how to add the replacement device, and conduct another procedure to logically add that device to the system so that the system now recognizes the replacement device. This requires additional time, is complex, and increases the chances of faulty installation of the replacement device. The present invention addresses, among other things, the complexity, time required, and ease of replacing an existing system member device.

In one embodiment, the enrollment or other device inclusion process can perform device replacement without an installer having to perform any removal processes for the device that is being replaced. From an installer's point of view, a one-step device replacement is achieved. Where the device to be removed shares configuration data indicative of the type of device that it represents, the replacement device takes the place of the removed device. For example, the new device can take the place of the existing/removed device in one or more other devices' lists of enrolled or otherwise authorized devices. In another representative embodiment, the one-step installation of the replacement device performs an add procedure to enroll the replacement device, and automatically removes the old device from the other one or more devices' lists of enrolled or otherwise authorized devices.

FIG. 1 is a block diagram generally illustrating a representative device replacement scenario in accordance with the present invention. While the devices to be replaced in FIG. 1 are depicted as complete devices, the following description is equally applicable replacement of one or more functional units of the device. Further, while any number of devices may be involved in the system 100, FIG. 1 illustrates a plurality of devices where one or more devices are identified as host devices 102, 104, and each host 102, 104 is associated with one or more client devices 106, 108, 110A, and 112, 114 respectively. The particular device configuration of FIG. 1 is merely for purposes of illustration, as the present invention is applicable to systems of any plurality of communicating devices, and whether some or all of the devices are peers, clients, hosts, etc., or any combination thereof.

Each of the devices may include some information that is made known to other devices, so that the other devices can recognize it and/or learn information about the other devices. In the illustrated embodiment, this is generically referred to as configuration information, which may or may not be associated with its binding information. Particularly, client-A 106 includes configuration information 116, client-B 108 includes configuration information 118, client-C 110A includes configuration information 120A. The host 102 may also include configuration information (not shown) that can be sent to the other devices, such as clients 106, 108, 110A, that the host-A 102 it will communicate with. Similarly, other devices such as host 104 may communicate with client-x 112, client-y 114, and so forth, each of which may include some configuration information 122, 124.

In one embodiment the configuration information refers to some information that is unique to each device in the system 100. The information does not need to be globally unique, but unique in the sense that it identifies one or more attributes of the particular device. For example, in one embodiment, the configuration information may include a device type (or in the case of a functional unit, a functional unit type), which specifies the type of device that the client represents. Examples of device types in the heating, ventilation and air conditioning (HVAC) context, device types may include a thermostat, humidistat, humidifier, dehumidifier, interface module, gateway, air cleaner, temperature sensor, zone panel, zone damper, etc. Examples of functional unit types include, for example, a user interface functional unit, a sensor functional unit, a control algorithm functional unit, and/or any other functional module that can be physically replaced in a device. Another embodiment alternatively or additionally includes a group identifier, such as in which zone in an HVAC system a device operates.

This and/or other configuration information may be exchanged between relevant devices at any desired time. In one embodiment, the configuration information is provided during the enrollment or binding stage of the device being added. For example, each client 106, 108, 110A may undergo a binding process with the host 102, where the host 102 learns the address ID and/or other binding information 116, 118, 120A of each client 106, 108, 110A. During this process, the configuration information can also be communicated. Again, communication of the configuration information need not be exchanged during such an enrollment or binding process, but in one embodiment it is communicated during enrollment/binding.

One, more or up to all of the devices in the system 100 may maintain its own record of which devices it has been bound to. For example, the host 102 may record the configuration information 116, 118, 120A, etc., of each of the clients to which it has been bound. FIG. 1 illustrates one manner of recording such data, which is shown in the network table 126 of host-A 102. Other devices may also maintain a record of which devices to which it has been bound, such as shown in the network table 128 of host-B 104. The phrase "network table" merely represents a record, list, table, any combination thereof, or other manner of maintaining a record of those devices to which it has been bound. Such record is locally stored at the respective host 102, 104 in one embodiment, although remote storage and trusted access by the device is equally applicable.

It should be noted that the network tables 126, 128 need not be stored in a single table, list, or other data structure. For example, the network table 126 is depicted as including a series of configuration information blocks 116, 118, etc. However, such a network table 126 may store individual configuration information 116, 118, 120A, 120B, etc. at multiple locations, although it is logically depicted in FIG. 1 as being collectively stored. Further, the configuration information within any one of the configuration information records (e.g., 116) need not be stored together, but rather portions thereof may be stored at different locations where the configuration information 116 merely depicts the configuration information associated with a device.

Using network table 126 as an example, it depicts a list of configuration information for each of the devices to which it has been bound. For example, it is assumed that the host-A 102 has been bound to each of the clients 106, 108, 110A, and thus their respective configuration information 116, 118, 120A is stored, which is depicted by network table 126. The host-A 102 can compare incoming communications with what is stored in its network table to determine if the incoming communication is from a device (including a functional unit) to which it has been bound. It should be recognized that the configuration information 116, 118, 120A, etc., need not be associated with "binding" information (e.g. addresses of bound devices), but rather may be stored separately, or with other types of information. However, in the embodiment of FIG. 1, it is assumed that the configuration information for each of the enrolled or otherwise bound devices is stored in the logically-depicted network table 126 which also serves as the records where a device such as host-A 102 can identify to which devices it is bound. For purposes of the example of FIG. 1, it is assumed that the configuration information is stored in a device's network table 126, 128, and is provided to that device during an enrollment or other binding process.

New devices can be added to the system, which may result in a new binding between the host 102 and the new device (not shown). In such case, the configuration information of that new device will also be stored in the network table 126. Another situation is where a client, such as client-C 110A, has failed, is due for replacement, or otherwise will be replaced in the system 100. The configuration information 120A for the client-C 110A is shown in the network table 126 as client-C configuration information 120A which corresponds to the relevant configuration information 120A of client-C 110A. If this device 110A is to be replaced, standard procedure involves an installer physically removing the device 110A, and performing a removal procedure to remove the client-C binding and associated configuration information 120A from the network table 126 and any other devices that might also have the client-C configuration information 120A in their respective network tables. The installer would then perform an add device procedure for a new device.

In accordance with one aspect of the invention, a replacement device 110B (which refers to the entire device or a functional unit(s) thereof) can effectively replace a device (which again refers to the entire device or a functional unit(s) thereof) that has failed, or is otherwise to be replaced or removed from the system 100. In one embodiment, only a device add procedure is performed for the replacement device 110B to add a device to a system. If the device configuration duplicates the relevant portion (including all) of an existing device configuration in the device's (or devices') recorded configuration information for other devices, the original device is logically removed from the system with the new device taking its place.

For example, assume client-C 110A is to be physically removed from the system. This device may be unable to have itself logically removed from other network tables, such as network table 126. This may be due numerous reasons, such as it being inoperable. For example, if an unenroll feature could be added to a client 110A, the inoperability of the client-C 110A necessarily prohibits it from notifying the host that it should be removed from host-A 102's network table 126. Thus, the client cannot be relied upon to assist in having itself removed from other devices' tables. Additionally, the host-A 102 may maintain a list of multiple devices to which it is bound, and in order to remove a device from its table 126, a complex user interface (UI) would be necessary to allow an installer to view, in a user-friendly fashion, each of the devices in the network table 126. The installer would then have to use the UI to locate the correct device to be removed, and then use the UI to actually remove it. Such a UI undesirably involves added complexity and cost to every system. Further, the installer must be trained as to how to logically remove the correct device.

In accordance with one embodiment of the invention, the client-C 110A need not be manually removed from the network table(s) 126 of the system. One embodiment involves enrolling a replacement device (Rep-Client-C 110B) which will ultimately replace the original client-C 110A. Rep-client-C 110B includes configuration information 120B that corresponds to the configuration information 120A of the device 110A it will replace.

In one exemplary embodiment, the rep-client-C 110B undergoes an enrollment process, which may be automatically or manually initiated. The configuration information 120A of the device 110A to be removed from the system 100 is already stored in the host's 102 network table 126 as entry 120A. When the rep-client-C 110B enrolls to form a binding with the host-A 102, the host-A 102 examines the configuration data 120B of the new device 110B, and compares this data 120B with the data of existing devices stored in the network table 126. If this comparison locates another system device with matching configuration data, a process is initiated to replace the configuration information 120A of the removed client-C 110A with the configuration information 120B of the replacing rep-client-C 110B. As described in more detail below, the configuration information 120B can be added as a new entry, shown as client-C configuration information 120B in network table 126, or may update the entry 120A of the network table 126.

For example, in one embodiment, a match of the new configuration information 120B will be found in the network table 126 where the configuration information of the new device 110B corresponds to that of an existing device 110A. When this match is determined during the enrollment process of replacement device 110B, one embodiment involves initiating a procedure to automatically remove the existing device 110A from the host's 102 network table 126. When the removal procedure completes by removing the stored client-C configuration information 120A from the network table 126, an add new device procedure is initiated and the new system device 110B takes the place of the removed device 110A. From a system maintenance point of view, a single system maintenance procedure of enrolling a new device has been executed, thereby concurrently removing a device 110A indicated for replacement.

It should be noted that a complete match of all of the configuration information is not required to identify a replacement device/functional unit. For example, the replacement device may be an upgrade that shares some but not all of the original configuration data of the device to be replaced. The "configuration data" to which a match is found may be only a portion of the configuration data, such as a matching zone number in the context of a thermostat. Other parts of the configuration data may differ between the original and replacement device. As another example, the relevant configuration data may be a matching device identifier where a functional unit of that device is being replaced. Thus, as used herein, the configuration data that is compared to determine that a device or functional unit is replacing another device or functional unit may involve only some relevant portion of the entirety configuration data.

In another embodiment, when a match is determined during the enrollment process of replacement device 110B, the particular configuration information 120A in host-A's network table 126 that identified the match remains as is, but other binding information (e.g. unique device address) of the new device may replace the analogous information from the removed device. In such an embodiment, no automatic removal process of the entry 120A of network table 126 is necessary, but rather an entry modification process is executed. The replacement device 110B thus takes the place of the replaced device 110A as a result of its configuration information 120B corresponding to that configuration information 120A of the device 110A to which it is replacing.

As previously indicated, a network table such as network table 126 may have portions of the configuration data stored in various locations in memory, or even stored in memory associated with different processing devices. Thus, the depiction of the collective network table 126 is provided for purposes of facilitating an understanding of this aspect of the invention.

Further, in one embodiment, a network table may be replicated. For example, the network table 126 may represent the working network table that is used by the system, but may be stored in memory that is not non-volatile. In one embodiment, the network table 126 is stored in a radio frequency (RF) module that controls transceiver functions and includes its own processing device(s) and memory to store the network table, but the network table 126 is stored in volatile memory. In this case, an image of the network table 126 (or information sufficient to create the network table) may be replicated in non-volatile memory, such as memory associated with another processing device(s) such as an application processor. Updates to the network table 126 can be updated in the other, non-volatile memory so that the network table 126 can be reproduced in the event of power down of the RF module and loss of data due to its non-volatile memory. Thus, references to the network table refers to any one or more working network tables that can be referenced in order to carry out the functions of the invention.

As shown in FIG. 1, each of the hosts (e.g., 102, 104, etc.) may have its own network table for the devices that have enrolled or otherwise been bound to it. Some client devices, such as a remote user interface, may be configured to operate with any of the hosts 102, 104. For example, a remote user interface (not shown) operating as a client device may be able to switch from controlling one host 102 to controlling another host 104. In such a case, the active network table 126, 128 for the active host can be sent to the remote user interface, so that the remote user interface can operate on behalf of the particular host to which it will currently control.

Figure 2A:
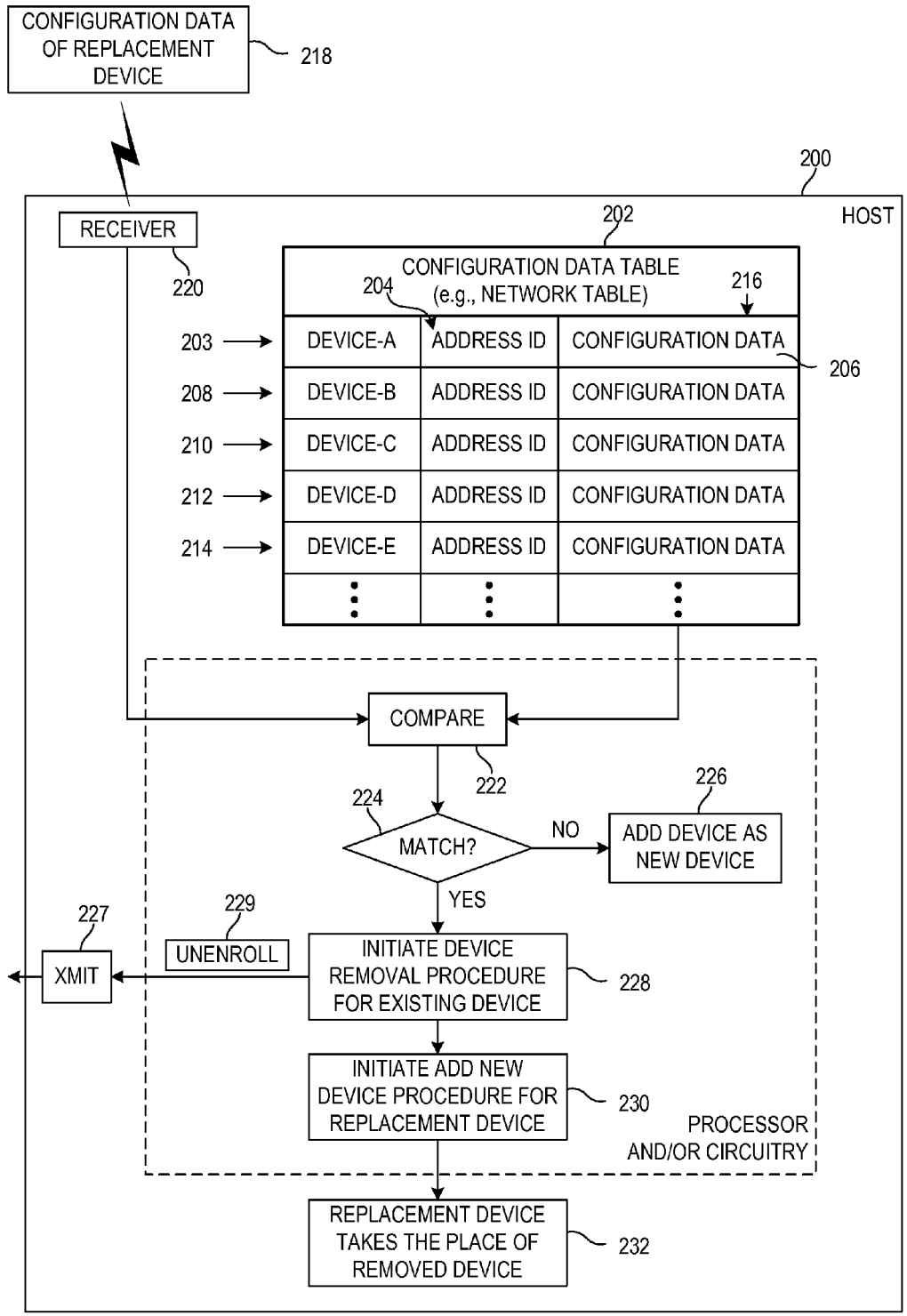
FIGS. 2A and 2B are block diagrams illustrating representative embodiments of a device that facilitates the replacement of a replacement device for an existing device.

FIG. 2A is a block diagram illustrating one embodiment of a host device 200 that facilitates the replacement of one client device for another client device. It should be noted that the description of FIG. 2A does not require any host/client relationship, but rather such a relationship is used for purposes of example.

The host 200 includes storage, shown as the configuration data table 202, to store configuration data for one or more of the devices to which it recognizes in the system. In the illustrated embodiment, the configuration data table 202 also serves as the network table where devices that have been bound to the host 200 are recorded. For example, a device-A (not shown) may have been bound to the host 200 through an enrollment or other binding process, resulting in a device-A record 203 that includes the address ID 204 of the actual device-A (not shown), and the configuration data 206 for device-A. The configuration data 206 may be provided to the configuration data table 202 during an enrollment or other binding process. Other records 208-214 may be provided for other devices that have been bound to the host 200. The table 202 may include more or less information in the records 203, 208-214 than is depicted in FIG. 2A, but includes at least the configuration data from the configuration data fields 216 that will be used to determine if a device is replacing an existing device already in the system. The table 202 may be stored in a table, list, database, discrete memory locations, or any other data structure desired. Thus, reference to "table" is used for purposes of convenience, and is not intended to denote any specific data structure. Further, as previously described, the data associated with any of the "records" 203, 208-214 may be stored in various locations in memory, different memories, etc., and need not be stored collectively. The collective depiction of the network table 202 is shown for purposes of illustration only, and the particular structure or location in which the data is stored is not relevant.

In one embodiment, the configuration data 206 represents any data that sufficiently identifies the corresponding device's configuration in the system. The device's configuration in the system refers to the device's role in the system, such as the type of device that it is, where or what part of the system the device will be used, etc. For example, in an HVAC context, devices may be associated with a particular zone. The devices may also have a device type identifier. The zone and the device type identifier may be used as the configuration data 206, as a replacement device of that same type in that same zone can replace an original device. In other embodiments, additional information can be provided, such as an identifier to distinguish between two or more like devices of the same type and in the same zone. As can be seen, the requisite specificity of the configuration data may be dependent upon the particular communication configuration of the system in which the invention is implemented.

It is assumed that an existing device (not shown) is listed among the records 203, 208, 210, 212, 214 of the configuration data table 202, thereby indicating that it has an enrolled status relative to (e.g. has been bound with) the host 200. If the existing device needs to be replaced, whether or not the existing device is still operational, a replacement device may be introduced to the system. The replacement device enters the enrollment process to bind itself with the host 200. In one embodiment, the configuration data 218 of this replacement device is transmitted in connection with the enrollment process to the host 200, and received at its receiver 220. The enrollment process may be initiated at the replacement device, at the host 200, or elsewhere.

The received configuration data 218 is compared 222 to at least the configuration data in the configuration data fields 216. The comparison may be implemented, for example, using a compare module including one or more programs executable via a processor to perform a comparison. In another embodiment the comparison is performed using discrete circuitry, such as comparators. If it is determined 224 that none of the configuration data of known devices in the configuration data fields 216 match that of the received configuration data 218, then the configuration data 218 is for a new device rather than a replacement device. In this case, the device is added 226 as a new device to the system. On the other hand, if it is determined 224 that any of the configuration data of known devices in the configuration data fields 216 match that of the received configuration data 218, then a removal procedure may be automatically initiated 228 for the existing device (i.e. the device that is being removed/replaced). An installer may be unaware of any removal procedure, as it can be automatically conducted in view of the host 200 recognizing the new device as a replacement device, through the use of proper configuration data that is indicative of the new device being a replacement. This removal procedure removes the existing enrolled client device from the host's 200 configuration data table 202. In one embodiment, the removal procedure also involves a transmitter 227 sending an unenroll message 229 to the existing enrolled device. Thus, if the existing device is still operative, it can receive the unenroll message and perform actions to remove itself from the system (e.g. clear its address, clear its network table, etc.). In other embodiments the client does not unenroll itself, and in still other embodiments no unenroll message 229 is sent to attempt to make the existing device unenroll itself.

In the embodiment of FIG. 2A, an add device procedure 230 is then performed to add the replacement device to the configuration data table 202 in place of the removed device. Thus, its configuration data (e.g. 206) and possibly address ID (e.g. 204) are stored in the table 202. Because the configuration data is the same for the replacement device as was for the original, now-removed device, the replacement device has taken the place of the removed device 232. It should be recognized that the order of the remove and add procedures can be reversed from what is depicted in FIG. 2A.

Figure 2B:
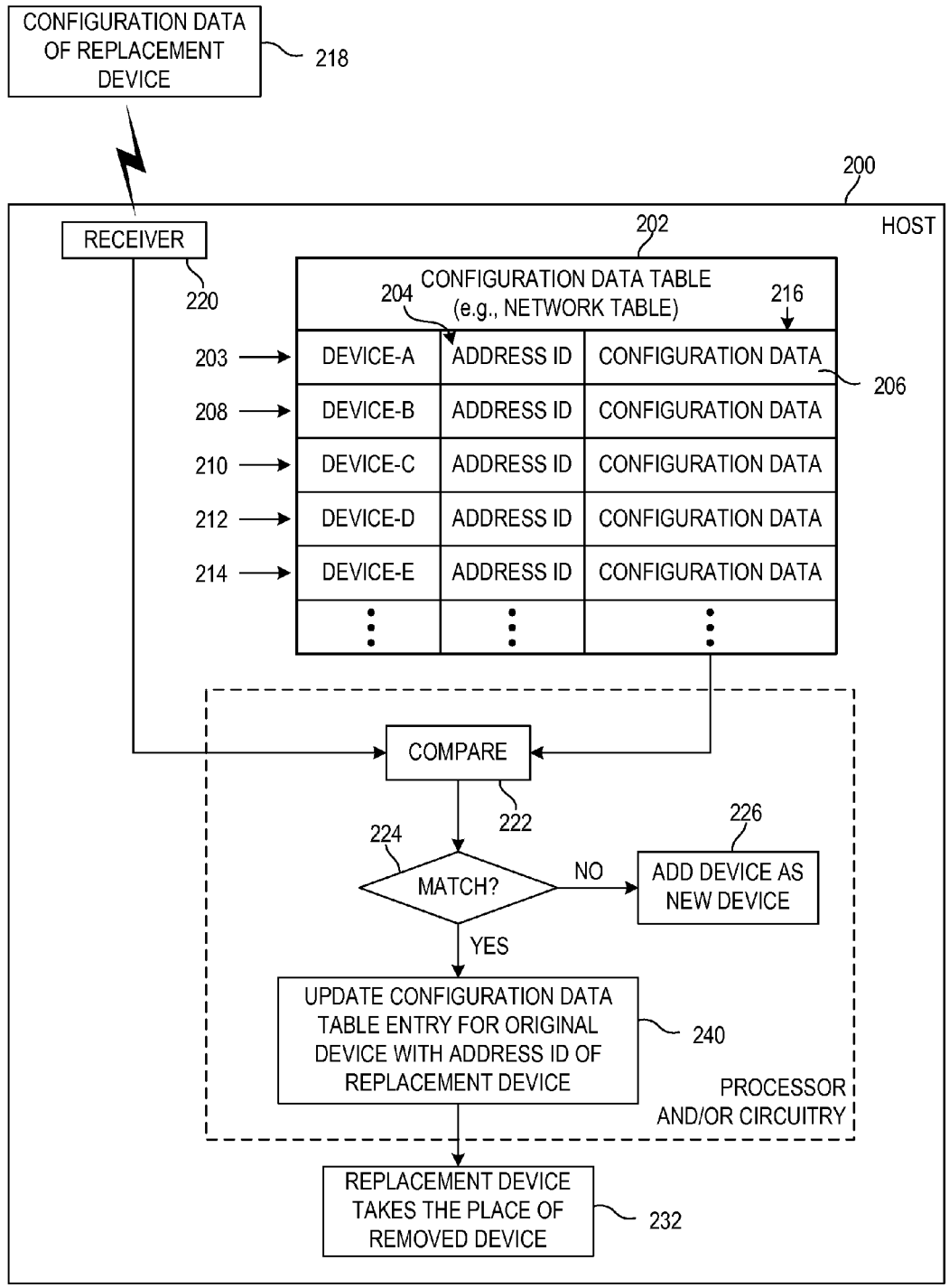

FIG. 2B is a block diagram illustrating another embodiment of a host device 200 that facilitates the replacement of one client device for another client device. Like reference numbers to those of FIG. 2A are used where appropriate. The embodiment of FIG. 2B is analogous to that of FIG. 2A through determination of whether a match 224 of the configuration data of known devices in the configuration data fields 216 match that of the received configuration data 218. In the embodiment of FIG. 2B, no removal procedure is conducted to remove the existing device from the configuration data table 202. Rather, a modification procedure is performed to change the information, other than at least the configuration data, for the existing device in the table 202.

For example, assume that the existing device (i.e. device being removed) was device-A corresponding to record 203 of table 202. Some information, such as the address ID 204 of the existing device, may be updated with the address ID of the replacement device. Other information not shown may also be updated in the configuration table for the replacement device. The configuration data 206 remains the same, as the configuration data 218 for the replacement device already matches the configuration data 206 of the original device. The record 203 then becomes the record for the replacement device, and thus the replacement device takes the place of the removed device 232.

Figure 3A:
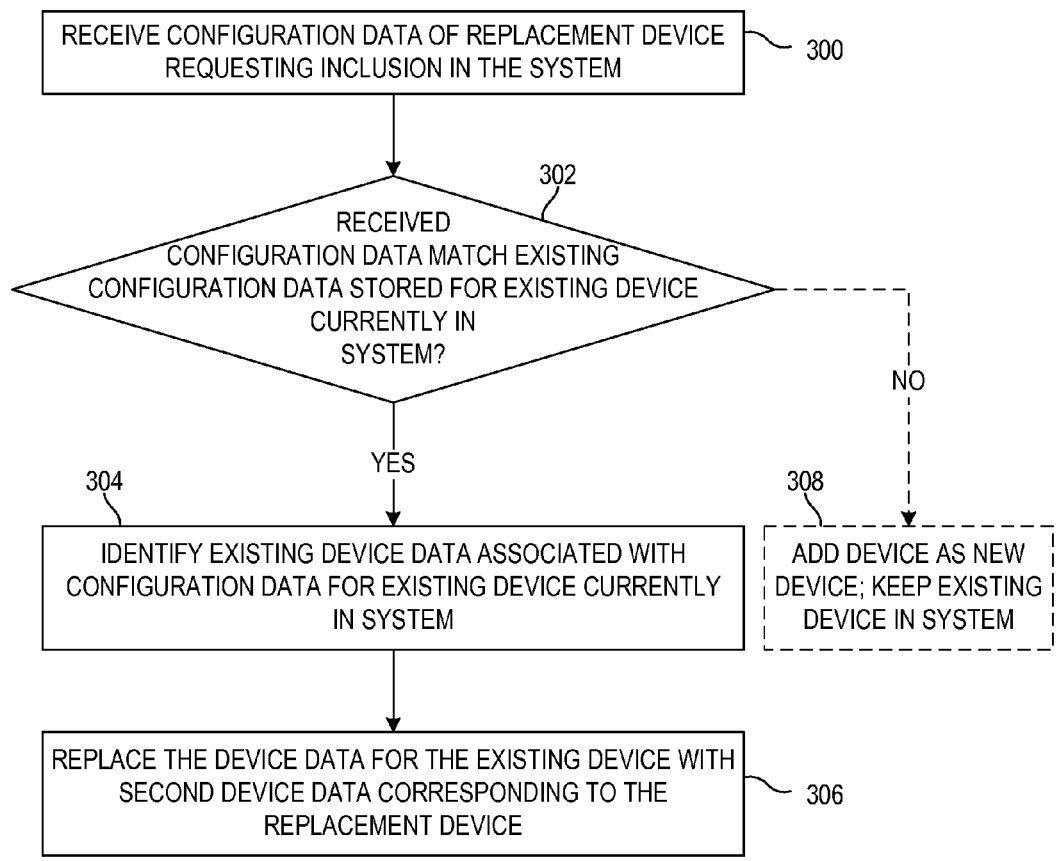
FIGS. 3A and 3B are flow diagrams illustrating exemplary methods for replacing communication devices in accordance with the invention.

FIG. 3A is a flow diagram illustrating an exemplary method for replacing communication devices in a system in accordance with the invention. System configuration data of a replacement device that is requesting inclusion in the system is received 300. It is determined 302 whether this received configuration data matches any existing configuration data stored for an existing device currently in the system. If so, device data (e.g. network table entry) for that existing device is identified 304, and is replaced 306 with second device data corresponding to the replacement device. While not pertinent to this embodiment, if no match 302 is found, the requesting device is not replacing another device, and may be added 308 as a new device while retaining the existing device in the system.

Figure 3B:
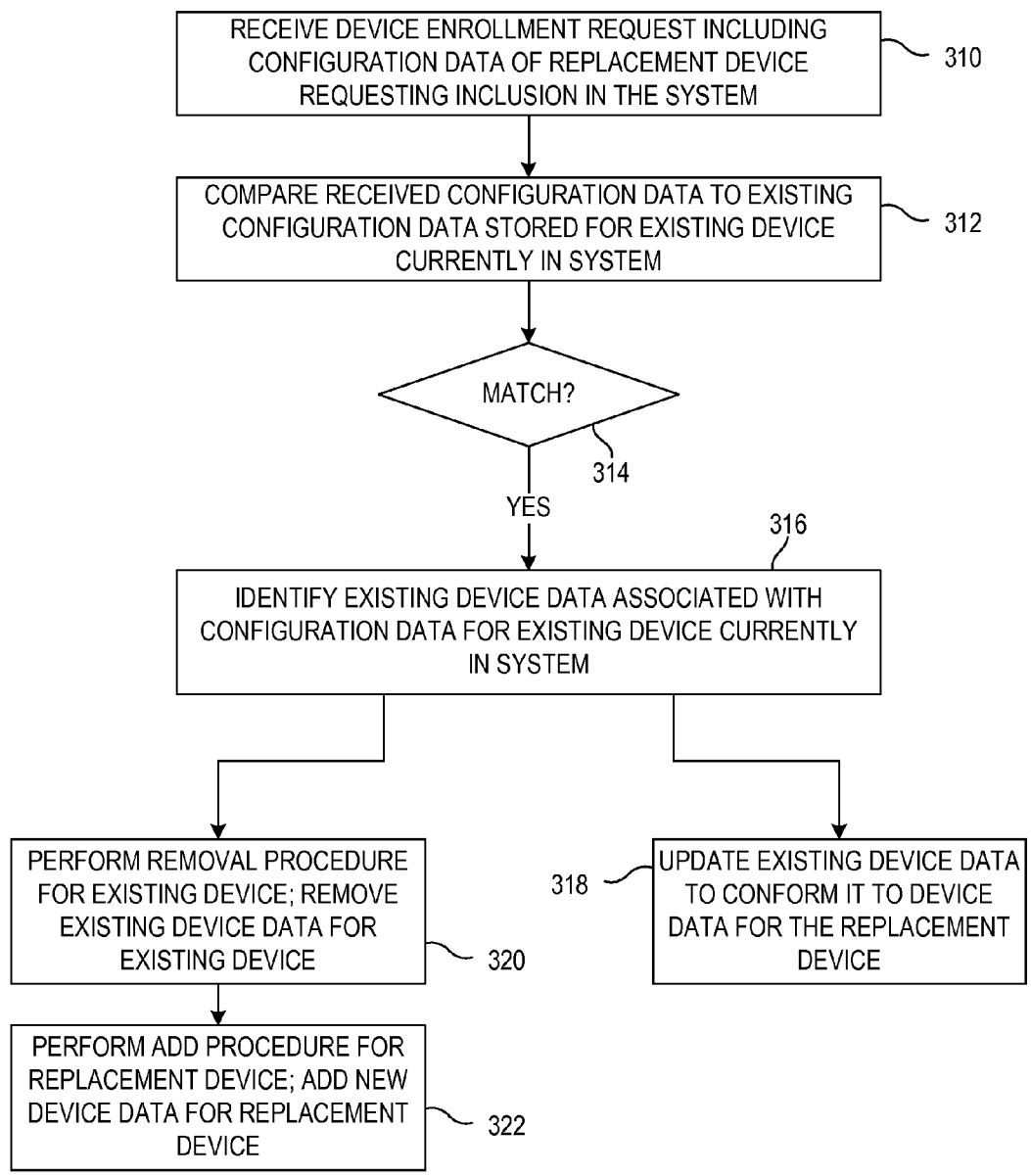

FIG. 3B is a flow diagram illustrating another exemplary method for replacing communication devices in a system in accordance with the invention. In this embodiment, a device enrollment request is received 310 that includes configuration data of a replacement device that is requesting inclusion in the system. The received configuration data is compared 312 to existing configuration data stored for any of the existing devices currently in the system. If there is a match 314, the existing device data for the matching existing device in the system is identified 316. In one embodiment, the existing device data is updated 318 to conform it to the device data for the replacement device. Thus, the replacement device physically takes the place of the existing device, and logically takes the place of the existing device in, for example, system tables of bound or otherwise authorized system devices. In another embodiment, a removal procedure is performed 320 for the existing device, such as by removing the existing device data for the existing device. Further, an add procedure for the replacement device is performed 322 in such an embodiment, such as by adding new device data (e.g. network table entry) for the replacement device. It should be noted that the order of operations of the method of FIG. 3B do not need to be performed in the order depicted in FIG. 3B. For example, the removal procedure 320, add procedure 322 and updating of existing device data 318 can be performed in any order, and the depiction is not intended to limit any actual operational sequence.

Figure 4:
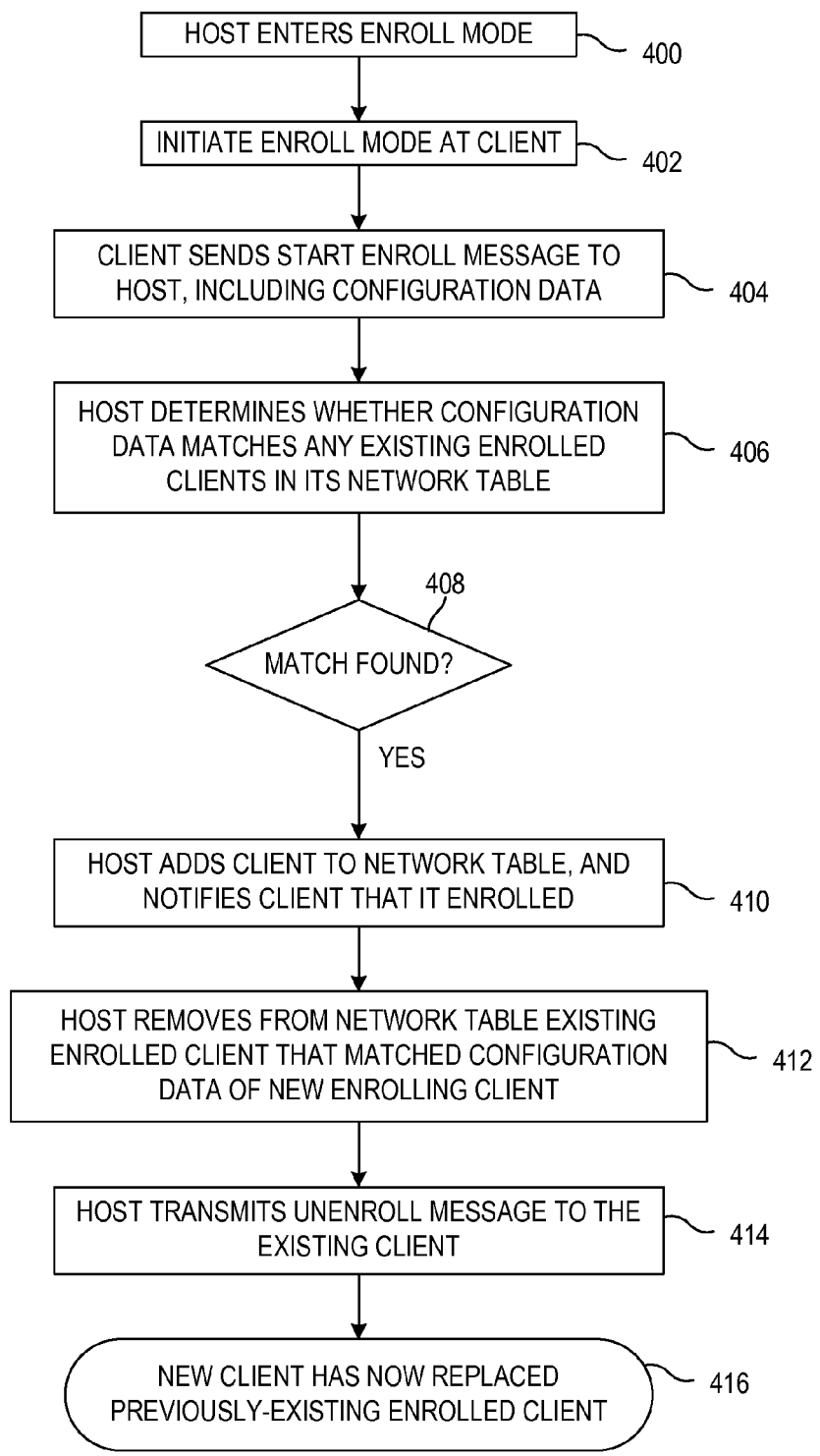
FIG. 4 is a flow diagram illustrating an embodiment for replacing communication devices during enrollment of a device to a system.

FIG. 4 is a flow diagram illustrating another embodiment for replacing communication devices during enrollment of a device to a system. Enrollment for purposes of FIG. 4 refers to the mechanism by which intended communicating devices learn about one another to enable them to intercommunicate. While the process of FIG. 4 is applicable to any device-to-device communication, it is presented in terms of clients and hosts, where the host may communicate with multiple clients and thus a plurality of clients enroll with the host. This means the host will store or otherwise be privy to a list of clients that have enrolled. Such a list can be stored in any fashion, such as the network tables previously described.

In the illustrated embodiment, the host enters an enroll mode as shown at block 400. For example, a button or other UI mechanism may be activated on the host device to place it in enroll mode. This may also be initiated remotely by sending an enroll mode initiation signal to the host device. In one embodiment, the host is equipped with a "connect" button that, upon pressing, places the host in enroll mode.

An enroll mode is initiated 402 at the client, such as by activating a UI mechanism at the client. In one embodiment initiating 402 the enroll mode causes a start enroll message to be created and sent 404, where this start enroll message includes configuration data representative of characteristics of the device as it will be used in the system. For example, in the HVAC context, the device being added may be a thermostat, and the configuration data may include a zone number of the zone to which the thermostat will be used. For example, in an area with three zones, the zone data that may be sent may include 01, 02, 03 as the possible zone numbers for that device. A device type may also provided in the configuration data in one embodiment. As an example in the HVAC context, a device type field is provided in the start enroll message. Illustrative examples of such device types in the HVAC context are illustrated in Table 1 below:

TABLE 1

| Device Type | Value |
|---|---|
| Air cleaner | 10 |
| Dehumidifier | 12 |
| Equipment Interface Module | 14 |
| ERV/HRV | 16 |
| Gateway | 20 |
| Humidifier | 21 |
| Humidistat | 22 |
| IAQ interface module | 30 |
| Outdoor sensor | 40 |
| Remote indoor temperature sensor | 41 |
| Remote user interface | 50 |
| Telephone access module | 55 |
| Thermostat | 03 |
| Zone Damper | 05 |
| Zone panel | 01 |

Thus, when sending the configuration data, the corresponding "value" of the device type can be sent to the host or other device to which the enrolling device is enrolling.

Zone numbers and device types are merely representative of the types of information that can be used in the configuration data for comparison with replacement devices. Any other data may be used, based on the specificity of the device being replaced. For example, where a functional unit of a device is being replaced, configuration data may include different or additional information, such as a functional unit type or functional unit identifier to identify the type of functional unit that is being replaced. As another example, replacement of a functional unit in a particular device type may have configuration data including a zone and a device type. A replacement functional unit can then replace the existing functional unit in the specified device type in the specified zone. Accordingly, in the context of replacing functional units, a device type as used herein may instead refer to the type of functional unit. Additionally, directives in an enroll message or other message may specify which portion(s) of the configuration data are to be considered when seeking a match to replace a device/functional unit. Thus, examples referring to zone numbers and device types are for purposes of facilitating an understanding of aspects of the invention, and the invention is clearly not limited to such configuration data types.

The host receives the client's start enroll message, and determines 406 whether the configuration data matches any existing enrolled clients in its network table. For example, assume the client sent a start enroll message with configuration data of zone 02, and device type 05. This indicates that the enrolling device is a thermostat in zone 2. If the host already has in its network table (or other relevant storage area) a thermostat in zone 02, then a match is found 408. The host adds 410 the client to its network table, and may notify the client that it enrolled. In one embodiment, the host removes 412 the existing enrolled client (e.g. existing thermostat in zone 2) from its network table, since it has matching configuration data to the newly enrolled client. In one embodiment, the host transmits 414 an unenroll message to the existing client to notify it that it has been removed from the system. The message may not be used by the client, such as in the situation where the original/existing client is no longer operational. The new client has now replaced 416 the original client. Again, it should be noted that the order of operations of the method of FIG. 4 do not need to be performed in the order depicted in FIG. 4. For example, the addition 410 of the client, removal 412 of existing enrolled client, and transmission 414 of an unenroll message can be performed in any order, and the depiction is not intended to limit any actual operational sequence.

The functions described in connection with the invention may be used in any device in which data is to be communicated. In one embodiment, the systems, apparatuses and methods of the invention are implemented in environmental monitoring and control systems, such as HVAC systems. Representative examples of such systems are generally described below. However, it should be recognized that the aforementioned systems, apparatuses and methods may be used in any communication device and associated system.

Environmental control systems can monitor and control numerous environmental and safety devices. These devices include, for example, thermostats, HVAC modules, equipment interfaces, sensors, remote controls, zoning panels, dampers, humidifiers and dehumidifiers, etc. It may be beneficial for some or all of these devices to communicate with each other wirelessly, which significantly eases installation and wiring complications. Wireless units also provide users with flexibility of use, and more options in positioning the devices. These and other advantages of implementing air interfaces have led to the use of the wireless transmission of some data in HVAC systems.

FIG. 5 is a block diagram generally illustrating representative HVAC elements and devices in which air interfaces may be used. FIG. 5 depicts one or more user control units 500, such as wireless thermostats where users can enter a temperature setpoint designating a desired temperature. Other examples of user control units 500 include humidity control units, lighting control units, security control units, etc. Climate or environmental systems 502 may include the equipment to cause the desired action to occur. One such system 502 is an HVAC system, which includes equipment to raise or lower temperature, humidity, etc. User control units 500 may communicate directly with such climate/environmental systems 502, and/or may communicate via one or more interfaces or zone controllers 504. Remote user control units 506 provide portable user control, such as providing a visual and/or audio interface to the user, and allowing the user to change environmental setpoints, check status, etc. Sensors 508 may be used to sense environmental conditions, and may be discrete devices (e.g. outdoor air/temperature sensor) or may be integrated into user control units 500. Flow and other control equipment 510 may also be used, such as dampers, ultraviolet air treatment lamps, etc. Any of these devices may need to communicate information amongst themselves and/or with other devices 512, in which the present invention may be utilized.

When these devices communicate wirelessly with one another via radio frequency (RF) or other wireless means, there is a reasonable chance that a wirelessly communicating device may experience interference from neighboring systems or other devices of the same system. Enrollment or other binding processes can be used in such systems to avoid such interference and ensure proper delivery of messages between devices. In one embodiment, when a first device enrolls with a second device, the second device stores information about the first device so that it knows the first device is part of the system and can communicate with that device. In some embodiments the first device also adds the second device to its network table or analogous list of associated system devices. As described above, the first device may require replacement, and the present invention provides efficient manners of doing so.

Some devices in the system may be powered by power sources and communicate via wire and/or over the air, while other devices may be battery-powered and communicate information wirelessly. Any device may be powered in any desired manner. In one embodiment, a host or other device may be powered by an AC voltage such as 24 volts AC (VAC), and may remain powered on while operating in the system. In some embodiments, devices referred to as hosts in the prior figures and description can correspond to such powered devices, or alternatively such hosts may be powered in other manners such as by battery or other DC voltage, energy harvesting, etc. In other embodiments, prior references to hosts can refer to any device in the system. Other devices that are powered by battery (e.g., clients) may enter a sleep mode to preserve battery life. In one embodiment, a collection of devices including a host(s) and its clients may be referred to as a "group," and a collection of physical groups that communicate through their host(s) may be referred to as a "system." However, a "system" as otherwise used herein does not require any such groupings, and may involve as few as two communicating devices, where a replacement device is to replace one of the existing devices or functional unit thereof.

Figure 6A:
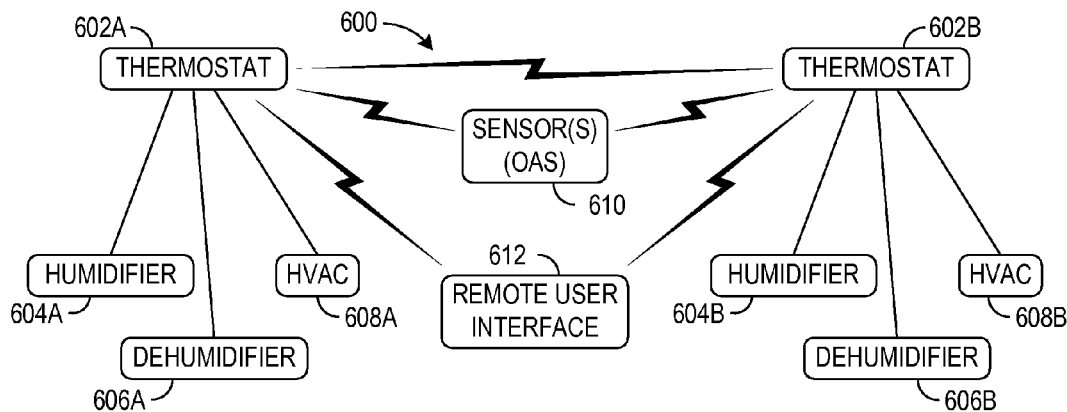
FIGS. 6A-6C depict some representative examples of clients, hosts, groups and systems that benefit from device replacement in accordance with the present invention.
Figure 6B:
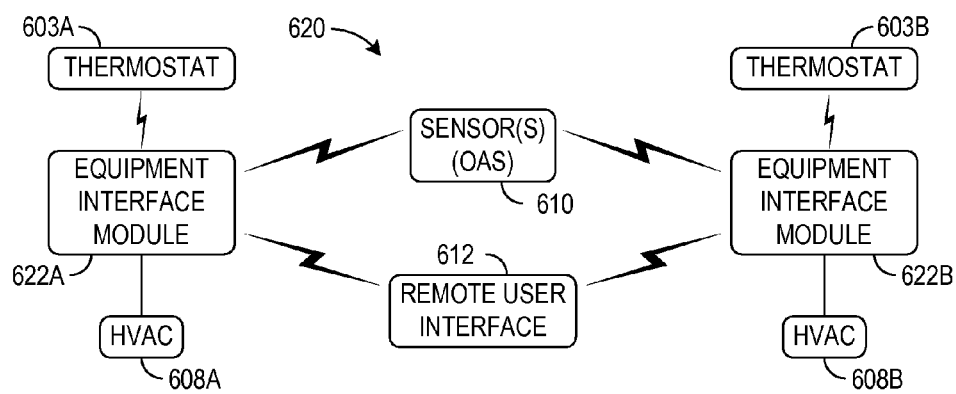
Figure 6C:
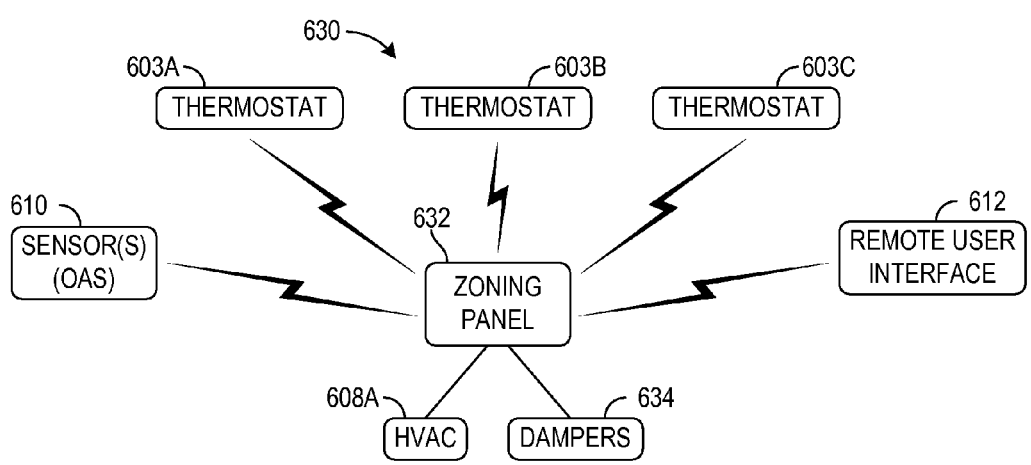

FIGS. 6A-6C depict some representative examples of clients, hosts, groups and systems that benefit from communicating in accordance with the present invention. Like reference numbers are used for analogous devices where appropriate in FIGS. 6A-6C.

FIG. 6A illustrates one system 600 where one or more thermostats 602A, 602B are configured as hosts, and may be powered by an AC power source, DC source or other power source. Each thermostat may be wired to other equipment such as humidifiers 604A, 604B, dehumidifiers 606A, 606B, and HVAC equipment 608A, 608B. Battery powered "clients" in the embodiment of FIG. 6A include one or more sensors 610, such as an outdoor air sensor (OAS), and one or more remote user interfaces (RUI) 612 which provide users with remote access and control of environmental conditions in the system 600. In accordance with one embodiment of the invention, clients (including one or more functional aspects thereof) such as the RUI 612 can be replaced by another replacement RUI or corresponding functional aspects without requiring installer actions to logically remove the existing RUI 612 from the network tables of hosts 602A, 602B.

FIG. 6B illustrates another exemplary system 620 where one or more thermostats 603A, 603B are configured as clients, and may be powered by batteries. Each thermostat 603A, 603B respectively communicates wirelessly with an equipment interface module (EIM) 622A, 622B that may be AC-powered and wired to respective HVAC equipment 608A, 608B. In this embodiment, each EIM 622A, 622B that operates as a host communicates with various clients. For example, host EIM 622A can communicate wirelessly with clients including the thermostat 603A, the sensor(s) 610, and the RUI(s) 612. Similarly host EIM 622B can communicate wirelessly with clients including the thermostat 603B, the sensor(s) 610, and the RUI(s) 612. In accordance with the invention, clients such as the thermostat 603A, or functional units thereof, can be replaced by another replacement thermostat or functional units without requiring installer actions to logically remove the existing thermostat 603A (or relevant portions thereof) from the EIM's 622A network table.

FIG. 6C illustrates another system 630 which utilizes area zoning using a zoning panel 632. In this embodiment, the zoning panel 632 serves as a host that may be AC-powered, and is connected to other equipment such as the HVAC 608A and dampers 634. Clients include the thermostats 603A, 603B, 603C, a sensor(s) 610, RUI 612, and possibly dampers 634 when such dampers are wirelessly controlled. In accordance with the invention, clients such as any of the thermostats 603A/BECAUSE or functional units thereof can be replaced by another replacement thermostat or functional units while automatically removing the existing thermostat that is being replaced.

It should be noted that the exemplary environments described in FIGS. 5 and 6A-6C are provided merely for purposes of facilitating an understanding of representative systems in which the principles of the present invention may be employed. From the description provided herein, one skilled in the art can readily appreciate that the invention may be employed in any system of two or more communicating devices where a new device (which includes sub-parts such as a functional unit) is added to the system to replace an existing device or functional unit.

The functions associated with the present invention may be performed by discrete circuitry and/or computing system hardware. In one embodiment, the devices that will communicate with one another, or at least devices that include the network table of associated devices, utilize a processor(s), CPU(s), computer(s), or other processing system to perform the stated functions. It should be understood that reference to a "processor" does not require a single processor or controller chip, but rather refers to the processing circuitry that executes programs to perform the various functions. Alternatively, part or all of the functions may be implemented using discrete circuitry. Accordingly, hardware, firmware, software or any combination thereof may be used to perform the various functions and operations described herein.

An example of a computing arrangement capable of executing programs to perform the various functions described above is shown in FIG. 7. The functional modules used in connection with the invention may reside in any device in which data is to be communicated, such as a host, client or other device. Devices implementing the present invention include thermostats, environmental control devices, local and remote interfaces, and/or other devices that may be used in any system involving the communication of data between devices. Representative examples of such systems include HVAC systems, security systems, area control systems, automotive systems, etc.

Figure 7:
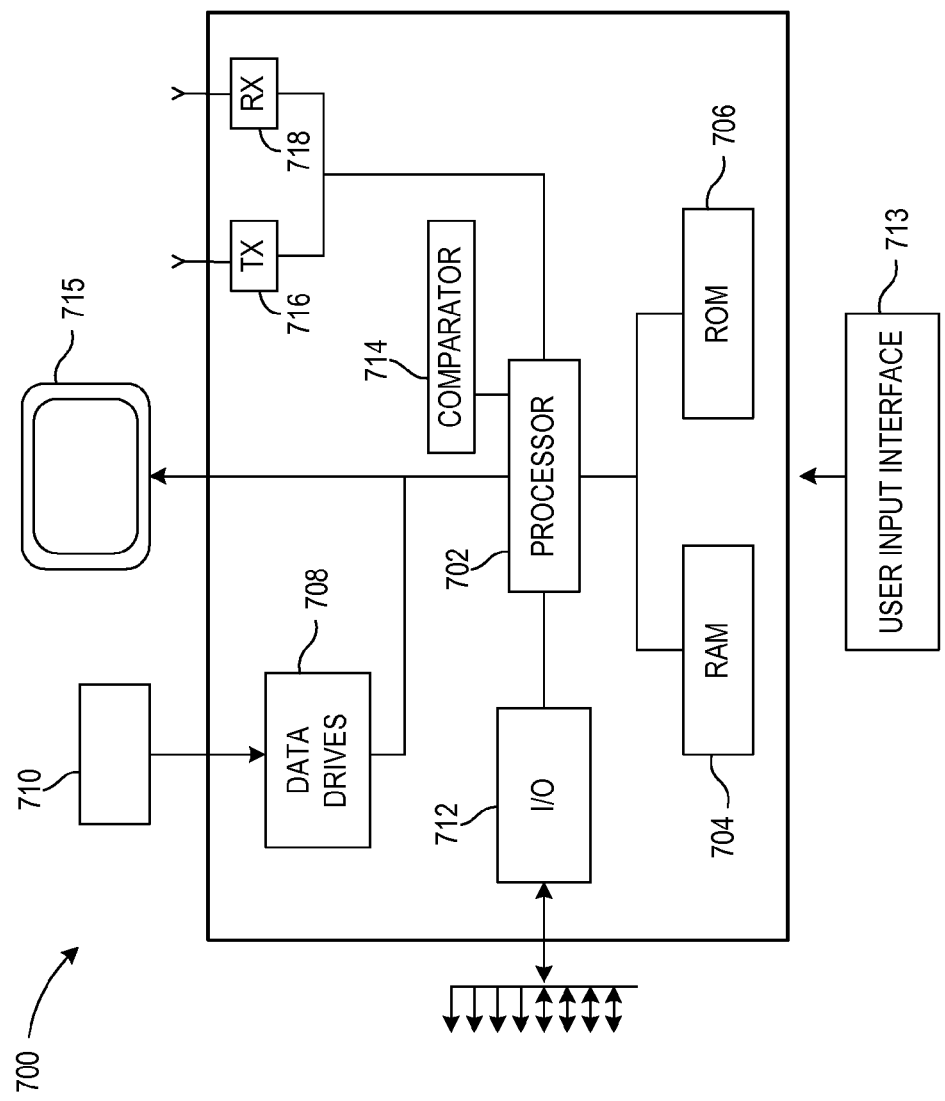
FIG. 7 illustrates a representative computing arrangement capable of executing programs to perform various functions of the invention.

Referring to FIG. 7, the representative computing or processing arrangement 700 includes a processing device(s), such as a central processing unit (CPU) 702. The processor can execute instructions to perform functions of the present invention. For example, the processor can determine whether received configuration data matches existing configuration data in its network table, and can identify other device data associated with the existing device. The processor can effect the replacement of the device data for the existing device with the device data corresponding to the replacement device. The processor can also carry out the stated remove device and add device procedures to remove the existing device and add the new replacement device to its network table. The processor can direct a transmitter to send an unenroll message to an existing device that is being replaced. The processor can also replace existing device data for an existing device by modifying device-specific information for that existing device with device-specific data for the replacement device. Thus, the processor can be programmed or otherwise configured to perform these and other stated functions described herein. It should be noted that discrete circuits can be used in lieu of or in addition to one or more processors.

The computing system 700 may include some storage, such as any one or both of random access memory (RAM) 704, read-only memory (ROM) 706, etc. For example, the device information for associated devices may be stored in a network table or other data structure. The computing arrangement 700 may instead or additionally include one or more data drives 708, such as disk drives, optical drives and/or other drives capable of receiving programs and/or data on transportable media 710. In one embodiment, software for carrying out the operations in accordance with the present invention may be stored and distributed on such media or other form of media capable of portably storing information. The software may also be transmitted to the computing arrangement 700 via data signals, such as being downloaded electronically via a network.

The processor 702 may communicate with other internal and external components, including removable storage (e.g. FLASH) through input/output (I/O) circuitry 712. I/O circuitry may also communicate control signals, communication signals, and the like. A user input interface 713 may be provided such as a mouse, keyboard/keypad, microphone, touch pad, trackball, joystick, touch screen, voice-recognition system, etc. Similarly, a user output device, such as a display 715 or speaker, may also be provided.

Where comparisons of received and stored configuration data are performed, this can be facilitated by one or more comparators. Comparators may be implemented using hardware, software operable in connection with the processor 702, or some combination of hardware and software. A comparator 714 may be integrally programmed as part of the processor 702 operation, or alternatively may be a separate comparator 714.

The representative computing arrangement 700 includes a transmitter(s) TX 716 and/or a receiver(s) RX 718. Such TX 716 and RX 718 components may be implemented as discrete components, or aggregated such as in the case of a transceiver. In one embodiment, the TX 716 and/or RX 718 are RF components capable of wirelessly communicating information via radio frequency waves.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, terms such as "modules" and the like as used herein are intended to include a processor-executable program that exists permanently or temporarily on any computer-usable medium or in any transmitting medium which transmits such a program. Such "modules" may also be implemented using discrete circuits.

As indicated above, memory/storage devices include, but are not limited to, disks, optical disks, removable memory devices such as smart cards, SIMs, WIMs, semiconductor memories such as RAM, ROM, PROMS, etc. Transmitting mediums in which programs can be provided include, but are not limited to, transmissions via wireless/radio wave communication networks, the Internet, intranets, telephone/modem-based network communication, hard-wired/cabled communication network, satellite communication, and other stationary or mobile network systems/communication links.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

What is claimed is:

1. A method for replacing communication devices in a system, comprising:
   receiving device enrollment information including at least configuration data of a replacement device requesting inclusion in the system, the configuration data including binding information that defines message interactions between the replacement device and neighboring devices;
   determining that the received configuration data matches existing configuration data stored for an existing device currently included in the system;
   identifying existing device data associated with the configuration data for the existing device currently included in the system; and
   replacing the device data for the existing device with second device data corresponding to the replacement device.

2. The method of claim 1, wherein replacing the existing device data comprises:
   removing a storage record that includes the existing device data and the configuration data for the existing device, in response to determining that the received configuration data matches the existing configuration data stored for an existing device currently included in the system; and
   adding a new storage record to replace the removed storage record, wherein the new storage record includes the received configuration data and the replacement device data.

3. The method of claim 2, further comprising transmitting an unenroll message to the existing device with an indication for the existing device to disassociate itself with the system.

4. The method of claim 1, wherein replacing the existing device data comprises modifying existing device-specific data for the existing device with replacement device-specific data for the replacement device, and retaining the existing configuration data as the configuration data for the replacement device.

5. The method of claim 4, wherein modifying the existing device-specific data comprises updating one or more device-specific data fields of a storage record that includes at least the one or more device-specific data fields and the existing configuration data for the existing device.

6. The method of claim 5, wherein at least one of the device-specific data fields of the storage record comprises a unique address identifier for the device associated with the storage record.

7. The method of claim 1, wherein receiving device enrollment information comprises receiving identifying data that will identify the replacement device's role in the system.

8. The method of claim 7, wherein the identifying data comprises a device type identifier and an identification of where in the system the replacement device will operate.

9. The method of claim 1, wherein identifying existing device data associated with the configuration data comprises locating a storage record including the existing device data and the configuration data for the existing device currently in the system.

10. The method of claim 1, wherein determining that the received configuration data matches existing configuration data comprises comparing the received configuration data to a data structure storing configuration data for each of a plurality of the devices in the system.

11. The method of claim 1, wherein the configuration data comprises one or more of a device type indicator and a zone indicator.

12. A method for replacing wireless communication devices in a heating, ventilation and air conditioning (HVAC) system, comprising:
 transmitting at least replacement configuration data from a replacement client requesting inclusion in the HV AC system;
 receiving the replacement configuration data at a host device;
 comparing the received replacement configuration data to a data structure of configuration data for each of a plurality of existing clients in the system that communicate with the host; and
 in response to determining via the comparing that the received replacement configuration data matches any configuration data in the data structure, automatically initiating a remove procedure to expunge a data record in the data structure for the existing client to which the matching configuration data corresponds, and adding a replacement data record to the data structure for the replacement client.

13. The method of claim 12, wherein the replacement configuration data includes binding information that defines message interactions between the replacement device and neighboring devices.

14. An apparatus operable in a system of communication devices, comprising:
 a receiver configured to receive a wireless device enrollment request including at least configuration data of a replacement device requesting inclusion in the system, the configuration data including binding information that defines message interactions between the replacement device and neighboring devices;
 storage storing a plurality of records for a corresponding plurality of devices in the system that communicate with the apparatus, each of the records including configuration data for its respective device;
 a compare module coupled to the receiver and to the storage and configured to determine whether the received configuration data matches the configuration data in any of the stored records; and
 a processor configured to, in response to the compare module's determination of a match of the received configuration data and the configuration data in one of the stored records, invoke both a remove procedure to remove the matching one of the stored records and an add procedure to add a new record for the replacement device to include the replacement device in the system.

15. The apparatus of claim 14, wherein the plurality of records each including respective configuration data are structured in one or a combination of a list, table, or database of devices that have undergone communication binding with the apparatus to enable communication with the apparatus.

16. The apparatus of claim 14, further comprising a transmitter, and wherein the processor is further configured to direct the transmitter to transmit an unenroll message to the device associated with the removed one of the stored records, wherein the unenroll message includes an indication for the removed device to disassociate itself with the system.

17. The apparatus of claim 14, wherein the replacement device comprises an environmental device operable in a heating, ventilation and air conditioning (HV AC) system.

18. The apparatus of claim 14, wherein the replacement device comprises a functional unit of another device.

19. A system comprising:
 a plurality of heating, ventilation and air conditioning (HV AC) client devices;
 at least one HV AC host device comprising:
  (a) a receiver configured to receive a wireless client enrollment request including at least configuration data of a replacement HV AC client requesting inclusion in the system;
  (b) storage storing a plurality of records for the plurality of HV AC clients, each of the records including configuration data for its respective HV AC client;
  (c) a compare module coupled to the receiver and to the storage and configured to identify a match of the received configuration data and the configuration data in one of the stored records; and
  (d) a processor configured to automatically invoke both a remove procedure to remove the matching one of the stored records, and an add procedure to add a new record for the replacement HVAC client to replace the removed one of the stored records with the added new record, in response to identification of the match.

20. The system of claim 19, wherein the configuration data includes binding information that defines message interactions between the replacement HV AC client and neighboring devices.

* * * * *